(12) United States Patent
Balay et al.

(10) Patent No.: US 8,369,258 B2
(45) Date of Patent: *Feb. 5, 2013

(54) SCALABLE IP-SERVICES ENABLED MULTICAST FORWARDING WITH EFFICIENT RESOURCE UTILIZATION

(75) Inventors: Rajesh I. Balay, San Jose, CA (US); Girish Bhat, San Diego, CA (US); Gregory Lockwood, Redwood City, CA (US); Rama Krishnan Nagarajan, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 13/015,880

(22) Filed: Jan. 28, 2011

(65) Prior Publication Data

US 2011/0122872 A1 May 26, 2011

Related U.S. Application Data

(60) Continuation of application No. 12/467,304, filed on May 17, 2009, now Pat. No. 7,881,244, which is a division of application No. 10/949,943, filed on Sep. 24, 2004, now Pat. No. 7,499,419.

(51) Int. Cl.
*H04H 20/71* (2008.01)
*H04L 12/56* (2006.01)
(52) U.S. Cl. .................................... 370/312; 370/390
(58) Field of Classification Search .................. None
See application file for complete search history.

(56) References Cited

U.S. PATENT DOCUMENTS

| | | | |
|---|---|---|---|
| 4,667,287 A | 5/1987 | Allen et al. | |
| 4,667,323 A | 5/1987 | Engdahl et al. | |
| 4,726,018 A | 2/1988 | Bux et al. | |
| 5,483,525 A | 1/1996 | Song et al. | |
| 5,490,252 A | 2/1996 | Macera et al. | |
| 5,491,691 A | 2/1996 | Shtayer et al. | |
| 5,568,525 A | 10/1996 | de Nijs et al. | |
| 5,581,705 A | 12/1996 | Passint et al. | |
| 5,598,414 A | 1/1997 | Walser et al. | |
| 5,633,866 A | 5/1997 | Callon | |
| 5,745,778 A | 4/1998 | Alfieri | |
| 5,825,772 A | 10/1998 | Dobbins et al. | |
| 5,825,891 A | 10/1998 | Levesque et al. | |
| 5,841,973 A | 11/1998 | Kessler et al. | |
| 5,841,990 A | 11/1998 | Picazzo et al. | |
| 5,875,290 A | 2/1999 | Bartfal et al. | |
| 5,892,924 A | 4/1999 | Lyon et al. | |
| 5,920,705 A | 7/1999 | Lyon et al. | |

(Continued)

OTHER PUBLICATIONS

Chan, Mun C. et al., "An architecture for broadband virtual networks under customer control." IEEE Network Operations and Management Symposium. Apr. 1996. pp. 135-144.

(Continued)

*Primary Examiner* — Robert Scheibel
*Assistant Examiner* — Hicham Foud
(74) *Attorney, Agent, or Firm* — Hamilton, DeSanctis & Cha LLP (57) ABSTRACT

Methods, apparatus and data structures are provided for managing multicast IP flows. According to one embodiment, a network switch module includes a memory and multiple processors partitioned among multiple virtual routers (VRs). Each VR maintains a data structure including information relating to multicast sessions handled by the VR and including a first pointer for each multicast session, a chain of blocks of second pointers and one or more TCBs. Each first pointer points to a chain of blocks of second pointers. Each second pointer corresponds to an OIF of the VR participating in the multicast session defined by the first pointer and defines how many times to replicate packets associated with the multicast session. The TCBs store control information relevant to processing or routing packets. Each second pointer points to a TCB, which identifies the OIF out which packets of the multicast session are transmitted from the VR.

14 Claims, 9 Drawing Sheets

U.S. PATENT DOCUMENTS

| | | |
|---|---|---|
| 5,963,555 A | 10/1999 | Takase et al. |
| 5,964,847 A | 10/1999 | Booth et al. |
| 5,987,521 A | 11/1999 | Arrowood et al. |
| 6,032,193 A | 2/2000 | Sullivan |
| 6,047,330 A | 4/2000 | Stracke |
| 6,069,895 A | 5/2000 | Ayandeh |
| 6,094,674 A | 7/2000 | Hattori et al. |
| 6,098,110 A | 8/2000 | Witkowski et al. |
| 6,118,791 A | 9/2000 | Fichou et al. |
| 6,134,226 A | 10/2000 | Reed et al. |
| 6,137,777 A | 10/2000 | Vaid et al. |
| 6,169,793 B1 | 1/2001 | Isoyama |
| 6,173,399 B1 | 1/2001 | Gilbrech |
| 6,175,867 B1 | 1/2001 | Taghadoss |
| 6,192,051 B1 | 2/2001 | Lipman et al. |
| 6,212,556 B1 | 4/2001 | Arunachalam |
| 6,220,768 B1 | 4/2001 | Barroux |
| 6,226,788 B1 | 5/2001 | Schoening et al. |
| 6,243,580 B1 | 6/2001 | Garner |
| 6,246,682 B1 | 6/2001 | Roy et al. |
| 6,249,519 B1 | 6/2001 | Rangachar |
| 6,256,295 B1 | 7/2001 | Callon |
| 6,260,072 B1 | 7/2001 | Rodriguez |
| 6,260,073 B1 | 7/2001 | Walker et al. |
| 6,266,695 B1 | 7/2001 | Huang et al. |
| 6,269,099 B1 | 7/2001 | Borella et al. |
| 6,278,708 B1 | 8/2001 | Von Hammerstein et al. |
| 6,286,038 B1 | 9/2001 | Reichmeyer et al. |
| 6,295,297 B1 | 9/2001 | Lee |
| 6,298,130 B1 | 10/2001 | Galvin |
| 6,304,557 B1 | 10/2001 | Nakazumi |
| 6,317,748 B1 | 11/2001 | Menzies et al. |
| 6,324,583 B1 | 11/2001 | Stevens |
| 6,330,602 B1 | 12/2001 | Law et al. |
| 6,338,092 B1 | 1/2002 | Chao et al. |
| 6,339,782 B1 | 1/2002 | Gerard et al. |
| 6,343,083 B1 | 1/2002 | Mendelson et al. |
| 6,434,619 B1 | 8/2002 | Lim et al. |
| 6,449,650 B1 | 9/2002 | Westfall et al. |
| 6,453,406 B1 | 9/2002 | Sarnikowski et al. |
| 6,459,682 B1 | 10/2002 | Ellesson et al. |
| 6,463,061 B1 | 10/2002 | Rekhter et al. |
| 6,466,976 B1 | 10/2002 | Alles et al. |
| 6,487,666 B1 | 11/2002 | Shanklin |
| 6,493,349 B1 | 12/2002 | Casey |
| 6,496,935 B1 | 12/2002 | Fink et al. |
| 6,526,056 B1 | 2/2003 | Rehkter et al. |
| 6,532,088 B1 | 3/2003 | Dantu et al. |
| 6,542,466 B1 | 4/2003 | Pashtan et al. |
| 6,542,502 B1 | 4/2003 | Herring et al. |
| 6,542,515 B1 | 4/2003 | Kumar et al. |
| 6,556,544 B1 | 4/2003 | Lee |
| 6,608,816 B1 | 8/2003 | Nichols |
| 6,611,498 B1 | 8/2003 | Baker et al. |
| 6,611,522 B1 | 8/2003 | Zheng et al. |
| 6,614,781 B1 | 9/2003 | Elliott et al. |
| 6,625,169 B1 | 9/2003 | Tofano |
| 6,625,650 B2 | 9/2003 | Stelliga |
| 6,629,128 B1 | 9/2003 | Glass |
| 6,631,519 B1 | 10/2003 | Nicholson et al. |
| 6,636,516 B1 | 10/2003 | Yamano |
| 6,638,516 B1 | 10/2003 | Yamano |
| 6,639,897 B1 | 10/2003 | Shiomoto et al. |
| 6,658,013 B1 | 12/2003 | de Boer et al. |
| 6,668,282 B1 | 12/2003 | Booth et al. |
| 6,697,359 B1 | 2/2004 | George |
| 6,697,360 B1 | 2/2004 | Gai et al. |
| 6,701,449 B1 | 3/2004 | Davis et al. |
| 6,738,371 B1 | 5/2004 | Ayres |
| 6,763,236 B2 | 7/2004 | Siren |
| 6,775,267 B1 | 8/2004 | Kung et al. |
| 6,775,284 B1 | 8/2004 | Calvignac et al. |
| 6,785,224 B2 | 8/2004 | Uematsu et al. |
| 6,785,691 B1 | 8/2004 | Hewett et al. |
| 6,802,068 B1 | 10/2004 | Guruprasad |
| 6,807,181 B1 | 10/2004 | Weschler |
| 6,816,462 B1 | 11/2004 | Booth et al. |
| 6,822,958 B1 | 11/2004 | Branth et al. |
| 6,856,676 B1 | 2/2005 | Pirot et al. |
| 6,868,082 B1 | 3/2005 | Allen et al. |
| 6,920,146 B1 | 7/2005 | Johnson et al. |
| 6,920,580 B1 | 7/2005 | Cramer et al. |
| 6,922,774 B2 | 7/2005 | Meushaw et al. |
| 6,938,097 B1 | 8/2005 | Vincent |
| 6,944,128 B2 | 9/2005 | Nichols |
| 6,944,168 B2 | 9/2005 | Paatela et al. |
| 6,954,429 B2 | 10/2005 | Horton et al. |
| 6,959,194 B2 | 10/2005 | Brouwer et al. |
| 6,980,526 B2 | 12/2005 | Jang et al. |
| 6,985,438 B1 | 1/2006 | Tschudin |
| 6,985,956 B2 | 1/2006 | Luke et al. |
| 7,020,143 B2 | 3/2006 | Zdan |
| 7,042,848 B2 | 5/2006 | Santiago et al. |
| 7,054,311 B2 | 5/2006 | Norman et al. |
| 7,068,656 B2 | 6/2006 | Sainomoto et al. |
| 7,082,477 B1 | 7/2006 | Sadhasivam et al. |
| 7,089,293 B2 | 8/2006 | Grosner et al. |
| 7,096,383 B2 | 8/2006 | Talaugon et al. |
| 7,096,495 B1 | 8/2006 | Warrier et al. |
| 7,116,665 B2 | 10/2006 | Balay |
| 7,149,216 B1 | 12/2006 | Cheriton |
| 7,159,035 B2 | 1/2007 | Garcia-Luna Aceves et al. |
| 7,161,904 B2 | 1/2007 | Hussain et al. |
| 7,181,547 B1 | 2/2007 | Millet |
| 7,187,676 B2 | 3/2007 | DiMambro |
| 7,197,553 B2 | 3/2007 | Roberts et al. |
| 7,221,945 B2 | 5/2007 | Milford et al. |
| 7,225,259 B2 | 5/2007 | Ho et al. |
| 7,243,371 B1 | 7/2007 | Kasper et al. |
| 7,266,120 B2 | 9/2007 | Cheng et al. |
| 7,272,643 B1 | 9/2007 | Sarkar et al. |
| 7,278,055 B2 | 10/2007 | Talaugon et al. |
| 7,293,355 B2 | 11/2007 | Kumar |
| 7,313,614 B2 | 12/2007 | Considine et al. |
| 7,316,029 B1 | 1/2008 | Parker et al. |
| 7,324,489 B1 | 1/2008 | Iyer |
| 7,499,419 B2 | 3/2009 | Balay |
| 7,587,633 B2 | 9/2009 | Talaugon et al. |
| 7,639,632 B2 | 12/2009 | Sarkar et al. |
| 7,720,053 B2 | 5/2010 | Hussain |
| 7,761,743 B2 | 7/2010 | Talaugon |
| 7,808,904 B2 | 10/2010 | Balay |
| 7,830,787 B1 | 11/2010 | Wijnands et al. |
| 7,843,813 B2 | 11/2010 | Balay |
| 7,869,361 B2 | 1/2011 | Balay |
| 7,876,683 B2 | 1/2011 | Balay |
| 7,881,244 B2 | 2/2011 | Balay |
| 7,885,207 B2 | 2/2011 | Sarkar |
| 7,890,663 B2 | 2/2011 | Millet |
| 7,912,936 B2 | 3/2011 | Rajagopalan |
| 7,925,920 B2 | 4/2011 | Talaugon |
| 7,933,269 B2 | 4/2011 | Cheng |
| 7,957,407 B2 | 6/2011 | Desai |
| 7,961,615 B2 | 6/2011 | Balay |
| 8,068,503 B2 | 11/2011 | Desai et al. |
| 8,107,376 B2 | 1/2012 | Balay et al. |
| 8,208,409 B2 | 6/2012 | Millet |
| 8,213,347 B2 | 7/2012 | Balay et al. |
| 8,320,279 | 11/2012 | Sarkar et al. |
| 2001/0024425 A1 | 9/2001 | Tsunoda et al. |
| 2001/0033580 A1 | 10/2001 | Dorsey et al. |
| 2001/0034733 A1 | 10/2001 | Prompt et al. |
| 2001/0043571 A1 | 11/2001 | Jang et al. |
| 2001/0052013 A1 | 12/2001 | Munguia et al. |
| 2002/0023171 A1 | 2/2002 | Garrett et al. |
| 2002/0062344 A1 | 5/2002 | Ylonen et al. |
| 2002/0071389 A1 | 6/2002 | Seo |
| 2002/0075901 A1 | 6/2002 | Perlmutter et al. |
| 2002/0097730 A1 | 7/2002 | Langille et al. |
| 2002/0099849 A1 | 7/2002 | Alfieri et al. |
| 2002/0150093 A1 | 10/2002 | Ott et al. |
| 2002/0150114 A1 | 10/2002 | Sainomoto et al. |
| 2002/0152373 A1 | 10/2002 | Sun et al. |
| 2002/0186661 A1 | 12/2002 | Santiago et al. |
| 2003/0012209 A1 | 1/2003 | Abdelilah et al. |
| 2003/0026262 A1 | 2/2003 | Jarl |
| 2003/0033401 A1 | 2/2003 | Poisson et al. |

| | | |
|---|---|---|
| 2003/0063590 A1 | 4/2003 | Mohan et al. |
| 2003/0108041 A1 | 6/2003 | Aysan et al. |
| 2003/0115308 A1 | 6/2003 | Best et al. |
| 2003/0117954 A1 | 6/2003 | De Neve et al. |
| 2003/0169747 A1 | 9/2003 | Wang |
| 2003/0200295 A1 | 10/2003 | Roberts et al. |
| 2003/0212735 A1 | 11/2003 | Hicok et al. |
| 2003/0223406 A1 | 12/2003 | Balay |
| 2004/0037279 A1 | 2/2004 | Zelig et al. |
| 2004/0141521 A1 | 7/2004 | George |
| 2004/0160900 A1 | 8/2004 | Lund et al. |
| 2004/0199567 A1 | 10/2004 | Lund |
| 2004/0199568 A1 | 10/2004 | Lund |
| 2004/0199569 A1 | 10/2004 | Kalkunte et al. |
| 2005/0002417 A1 | 1/2005 | Kelly et al. |
| 2005/0055306 A1 | 3/2005 | Miller et al. |
| 2005/0081059 A1 | 4/2005 | Bandini et al. |
| 2005/0108340 A1 | 5/2005 | Gleeson et al. |
| 2005/0113114 A1 | 5/2005 | Asthana |
| 2005/0147095 A1 | 7/2005 | Guerrero et al. |
| 2005/0163115 A1 | 7/2005 | Dontu et al. |
| 2006/0087969 A1 | 4/2006 | Santiago et al. |
| 2006/0206713 A1 | 9/2006 | Hickman et al. |
| 2010/0142527 A1 | 6/2010 | Balay et al. |
| 2010/0146098 A1 | 6/2010 | Ishizakl et al. |
| 2010/0146627 A1 | 6/2010 | Lin |
| 2010/0189016 A1 | 7/2010 | Millet |
| 2010/0220732 A1 | 9/2010 | Hussain et al. |
| 2010/0220741 A1 | 9/2010 | Desai et al. |
| 2011/0032942 A1 | 2/2011 | Matthews et al. |
| 2011/0122872 A1 | 5/2011 | Balay |
| 2011/0235548 A1 | 9/2011 | Balay |
| 2011/0235649 A1 | 9/2011 | Desai |
| 2012/0057460 A1 | 3/2012 | Hussain |
| 2012/0069850 A1 | 3/2012 | Desai |
| 2012/0072568 A1 | 3/2012 | Matthews |
| 2012/0099596 A1 | 4/2012 | Balay |
| 2012/0131215 A1 | 5/2012 | Balay et al. |

OTHER PUBLICATIONS

Chan, Mun C. et al "Customer Management and Control of Broadband VPN Services." Proc. Fifth IFIP/IEEE International Symposium of Integrated Network Management. May 1997. pp. 301-314.
Gasparro, D.M., "Next-Gen VPNs: The Design Challenge." Data Communications. Sep. 1999. pp. 83-95.
Hanaki, M. et al., "LAN/WAN management integration using ATM CNM interface." IEEE Network Operations Management Symposium, vol. 1. Apr. 1996. pp. 12-21.
Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.
Keshav, S., "An Engineering Approach to Computer Networking: ATM networks, the internet, and the telephone network." Reading Mass: Addison-Wesley, Addison-Wesley Professional Computing Series. 1992. pp. 318-324.
Kim, E.C. et al., "The Multi-Layer VPN Management Architecture." Proc. Sixth IFIP/IEEE International Symposium on Integrated Network Management. May 1999. pp. 187-200.
International Search Report for PCTUS03/17674. 6 pgs.
Notice of Allowance for U.S. Appl. No. 12/328,858 mailed May 25, 2012.
Notice of Allowance for U.S. Appl. No. 12/762,362 mailed May 22, 2012.
Non-Final Rejection for U.S. Appl. No. 12/637,140, mailed Sep. 17, 2010.
Non-Final Rejection for U.S. Appl. No. 12/537,898, mailed Sep. 9, 2010.
Final Rejection for U.S. Appl. No. 12/202,223, mailed Sep. 16, 2010.
Non-Final Rejection for U.S. Appl. No. 12/202,233 mailed Jun. 21, 2010.
Non-Final Rejection for U.S. Appl. No. 11/460,977, mailed Jul. 2, 2010.
Non-Final Rejection for U.S. Appl. No. 12/477,124 mailed May 23, 2011.
Non-Final Rejection for U.S. Appl. No. 11/537,609 mailed Jul. 11, 2011.
Notice of Allowance for U.S. Appl. No. 13/305,743 mailed Jul. 25, 2012.
Notice of Allowance for U.S. Appl. No. 11/530,901 mailed Jul. 20, 2012.
Notice of Allowance for U.S. Appl. No. 09/952,520 mailed Jul. 6, 2012.
Office Action dated Nov. 28, 2007 for U.S. Appl. No. 09/952,520.
Office Action dated Oct. 16, 2007 for U.S. Appl. No. 09/661,130.
Office Action dated Oct. 18, 2007 for U.S. Appl. No. 09/663,483.
IEEE Potentials Publication; "Local Area Networks" Dec. 1995/Jan. 1996; pp. 6. http://www.ece.uc.edu/-paw/potentials/sample.
Lawrence, J. Lang et al."Connecting Remote FDDI Installations with Single-Mode Fiber, Dedicated Lines, or SMDS." Jul. 1990; ACM SIGCOMM Computer Communication Review. vol. 20, Issue 3; pp. 72-82.
Non-Final Rejection for U.S. Appl. No. 12/328,858, mailed Dec. 6, 2011.
Non-Final Rejection for U.S. Appl. No. 12/762,362 mailed Feb. 2, 2012.
Non-Final Rejection for U.S. Appl. No. 13/359,960, mailed Apr. 26, 2012.
Non-Final Rejection for U.S. Appl. No. 12/259,296, mailed Sep. 27, 2011.
Final Rejection for U.S. Appl. No. 12/477,124, mailed Nov. 4, 2011.
Non-Final Rejection for U.S. Appl. No. 11/530,901, mailed Nov. 9, 2011.
Non-Final Office Action for U.S. Appl. No. 11/849,352 mailed Jul. 17, 2009.
Non-Final Office Action for U.S. Appl. No. 10/991,970 mailed May 18, 2009.
Non-Final Office Action for U.S. Appl. No. 10/991,969 mailed Apr. 27, 2009.
Non-Final Office Action for U.S. Appl. No. 11/684,614 mailed Apr. 24, 2009.
Notice of Allowance for U.S. Appl. No. 12/477,124 mailed Sep. 19, 2012.
Rao, J.R., Intranets and VPNs: Strategic Approach. 1988 Annual Review of Communications. 1998. pp. 669-674.
Tanenbaum, A.S., "Computer Networks." Upper Saddle River, N.J.: Prentice Hall PTR, 3rd Edition. 1996. pp. 348-364.
European Search Report for PCT/US03/37009 (Jul. 4, 2004) 2 pgs.
International Search Report for PCTUS03/17674. 6 pgs, 2003.
Non-Final Rejection for U.S. Appl. No. 12/906,999 mailed Nov. 21, 2012.
Non-Final Rejection for U.S. Appl. No. 13/050,387 mailed Nov. 13, 2012.

SCALABLE IP-SERVICES ENABLED MULTICAST FORWARDING WITH EFFICIENT RESOURCE UTILIZATION

CROSS-REFERENCE TO RELATED APPLICATIONS

This application is a continuation of U.S. patent application Ser. No. 12/467,304, filed May 17, 2009, now U.S. Pat. No. 7,881,244, which is a divisional of U.S. patent application Ser. No. 10/949,943 filed Sep. 24, 2004, now U.S. Pat. No. 7,499,491, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2004-2011, Fortinet, Inc.

BACKGROUND

1. Field

Various embodiments of the present invention are generally related to the field of telecommunications and more particularly, but not by way of limitation, to network switches and systems and methods for multicast internet protocol (IP) forwarding.

2. Description of the Related Art

The use of computer or communications networks, including Local Area Networks (LANs), Wide-Area Networks (WANs), and the Internet continues to grow at ever increasing rates. Each day, more and more computer systems or communications devices are becoming interconnected in such wired or wireless networks, which typically communicate data in packets. This has created a need for high performance network switches, such as for use by network service providers. Many such switches comprise multiple modules, with many data flows between the modules themselves and between the interfaces to external networks. A data flow is sometimes called an "IP flow," which refers to a stream of packets that enter and exit the same set of interfaces. The packets of a particular IP flow have the same values in the IP packet header for the following six attributes of the IP packet header: (1) Source IP Address, (2) Source L4 Port, (3) Type of Service (TOS), (4) Destination IP Address, (5) Destination L4 Port, and (6) Protocol.

In some cases, the network switch modules, including the processors residing in the modules, can be partitioned into virtual routers (VRs), that is, software running on the processors that emulates the functioning of an individual physical hardware router. As a result of the combination of hundreds of thousands of data flows for the virtual routers in these network switches, there is a need for efficiently processing packet data flows, and for controlling the resources consumed within the network switch.

As broadband network access becomes more available, individual subscribers of network service providers have more available options for different services and service levels. Even the same subscriber may have different service needs at different times. As an illustrative example, a first subscriber may desire high definition television (HDTV) service over a network. A second subscriber may desire mobile telephone service over the network. The first subscriber may occasionally desire video-on-demand (VOD). The second subscriber may need to switch between voice communication and high-speed digital data communication.

A "unicast" communication typically refers to a communication from a single source device to a single destination device over a network. By contrast, a "multicast" communication typically refers to a communication to a group of destination devices from one or more source devices. Multicast packet forwarding raises additional complexity because of the many destination devices. Many existing router devices will be unable to provide the desired scalability to accommodate such additional destination devices. This is particularly true when each individual data flow may require "per-flow" services for the multicast traffic. Allocating resources efficiently for a large number of multicast data flows is a challenging problem. Moreover, multicast broadcasting of content presents additional complexity because individual users may join or leave a particular multicast group at will and often. Such "channel surfing" creates an additional burden for keeping track of the participants of a multicast group so that the content can be routed appropriately.

SUMMARY

Methods, apparatus and data structures for managing multicast Internet Protocol (IP) flows are described. According to one embodiment, a network switch module includes a memory partitioned among multiple virtual routers (VRs) and multiple processors partitioned among the VRs. Each VR maintains a data structure in the memory. The data structure includes information relating to a set of multicast sessions being handled by the VR, including a first pointer for each multicast session in the set of multicast sessions, at least one chain of one or more blocks of second pointers and one or more transmit control blocks (TCBs). Each first pointer points to one chain of one or more blocks of second pointers. Each second pointer corresponds to an outbound interface (OIF) of the VR participating in the multicast session defined by the first pointer and defines how many times packets associated with the multicast session are to be replicated. The TCBs represent data structures configured to store control information relevant to processing or routing packets. Each second pointer points to a TCB and each TCB identifies the OIF out which packets of the multicast session are transmitted from the VR.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Methods, apparatus and data structures for multicast internet protocol (IP) forwarding are described herein. In the following description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Moreover, it should be understood that although the flow diagrams may depict serial operations, certain embodiments could perform certain of those operations in parallel.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Some portions of the following detailed description are presented in terms of algorithms and symbolic representations of operations on data bits within a computer memory. These algorithmic descriptions and representations are the ways used by those skilled in the data processing arts to most effectively convey the substance of their work to others skilled in the art. An algorithm includes a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Figure 1:
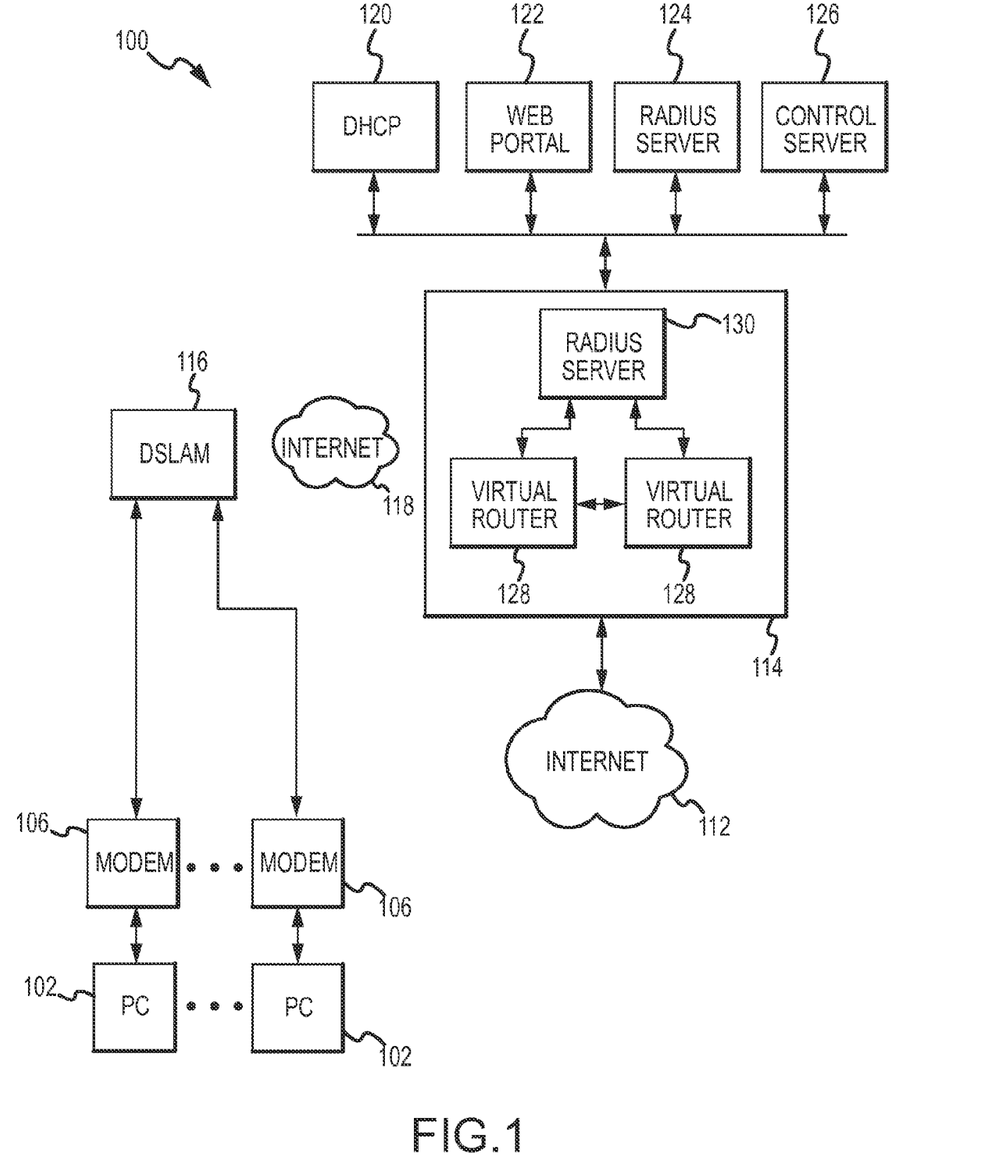
FIG. 1 is a block diagram of one example of an operating environment for the present system and methods.

FIG. 1 is a block diagram of one example of an operating environment for the present system and methods. In the example of FIG. 1, a system 100 typically includes personal computers (PCs) 102 that are respectively connected to modems 106. The modems 106 are typically respectively connected to a digital subscriber line access module (DSLAM) 116. The DSLAM 116 multiplexes signals from the modems 106 onto the Internet Protocol (IP) network 118. The IP network 118 is typically connected to a router box 114 that includes virtual routers (VRs) 128. The router box 114 is typically connected to the Internet 112. The router box 114 is also typically connected to a dynamic host configuration protocol (DHCP) server 120, a web portal 122, a RADIUS server 124, and a control server 126.

Although, in this example, the router 114 includes three VRs 128, other examples call for any number of VRs 128. In one example, one or more of the VRs 128 can establish subscriber connections, such as to users of the PCs 102. When establishing such connections, the VRs 128 can use the DHCP server 120 for assigning IP network addresses to the PCs 102. The VRs 128 can use the RADIUS server 124 to authenticate subscribers. After authenticating subscribers, the VRs 128 can configure subscriber connections according to service profiles, which refer to subscriber-specific services that individual subscribers receive during connections. In one example, the VRs 128 can receive service profiles information from the control server 126 or the RADIUS server 224.

After the VRs 128 establish subscriber connections, they typically provide access to the web portal 122, where users can select new services. Additionally, after establishing subscriber connections, the VRs 128 typically process and forward packets over the IP network 118 and the Internet 112. Although FIG. 1 illustrates an example in which the users accessing the Internet 112 via PCs, this is merely an illustrative example. In other examples, the individual users may access the Internet 112 or other computer or communications network wirelessly, such as by using a 3rd Generation (3G) or other mobile phone or other handheld or portable device, or by using a laptop or other portable computing device with Wireless Fidelity (WiFi) (e.g., using IEEE 802.11b wireless networking) capability or the like. In still other examples, the individual users may access the Internet 112 or other communications or computer network using an Ethernet connection, a Very High bit rate Digital Subscriber Line (VHDSL) connection, a Fiber To The Premises (FTTP) connection, or a cable TV line or like connection, or the like. Thus, the present systems and methods are not limited to any particular devices or techniques for accessing the Internet 112, such as through the router box 114. The exemplary system 100 typically provides network services to thousands of subscribers. Each subscriber can receive a particular set of services upon establishing a connection with the system 100.

Figure 2:
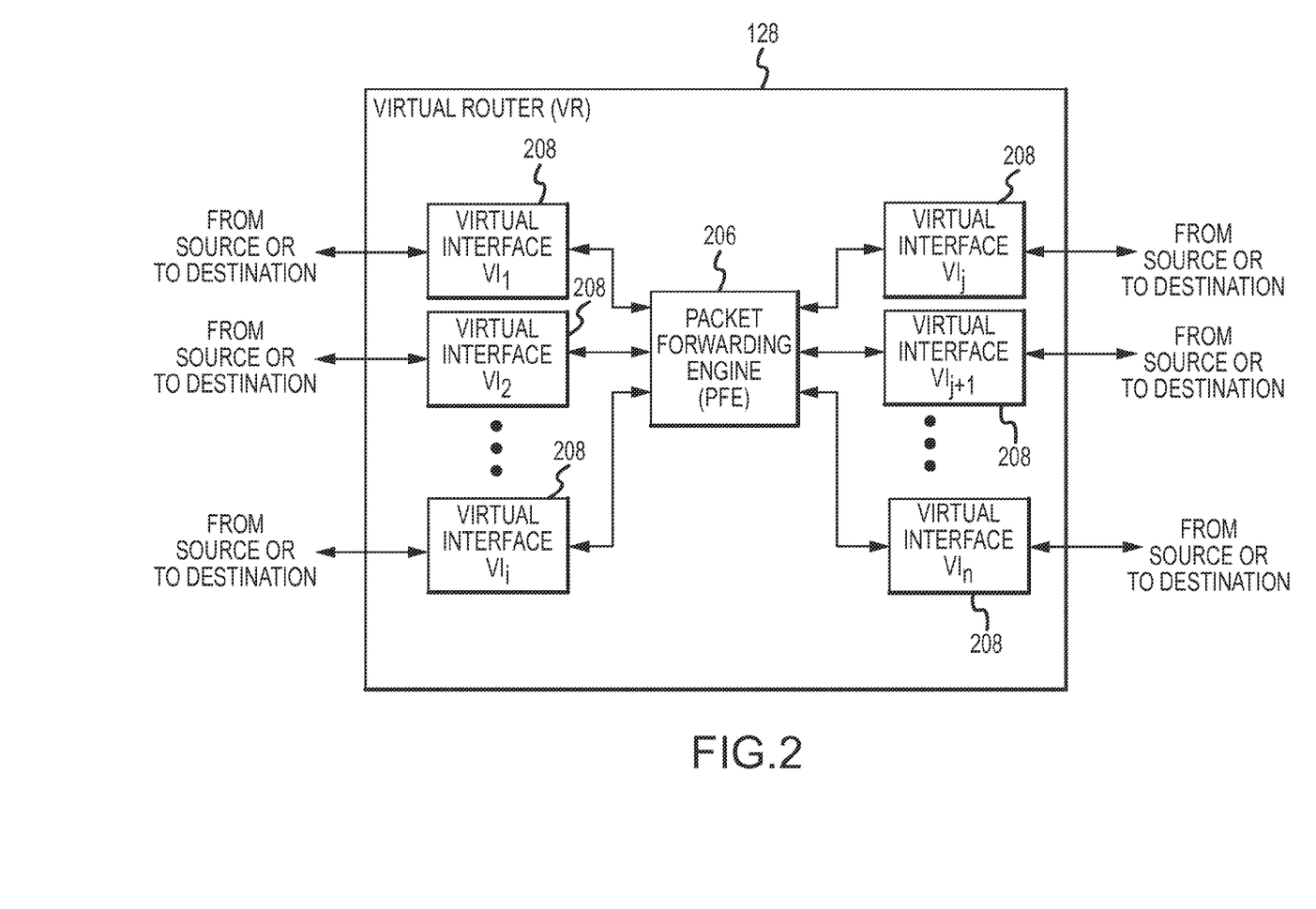
FIG. 2 is a block diagram of one example of a Virtual Router (VR) in accordance with an embodiment of the present invention.

FIG. 2 is a block diagram of one example of a VR 128. In this example, the VR 128 includes a packet forwarding engine (PFE) 206, and one or more virtual interfaces (VIs) 208 from a source or to a destination. A VI over which multicast packets are forwarded is sometimes referred to as an Outbound Interface (OIF). Different services can be applied to multicast packet forwarding traffic as well as unicast packet forwarding traffic. Which services are applied to a particular packet are determined, in one example, by an inbound policy or an outbound policy associated with a particular VI 208. In one example, the packet header (e.g., one or more of the above-described six packet header attributes defining an IP flow) is examined (e.g., such as by comparing such attribute(s) to one or more matching criteria in an access control list (ACL)) to determine whether any services should be applied to the packet and, if so, which services should be applied.

Figure 3:
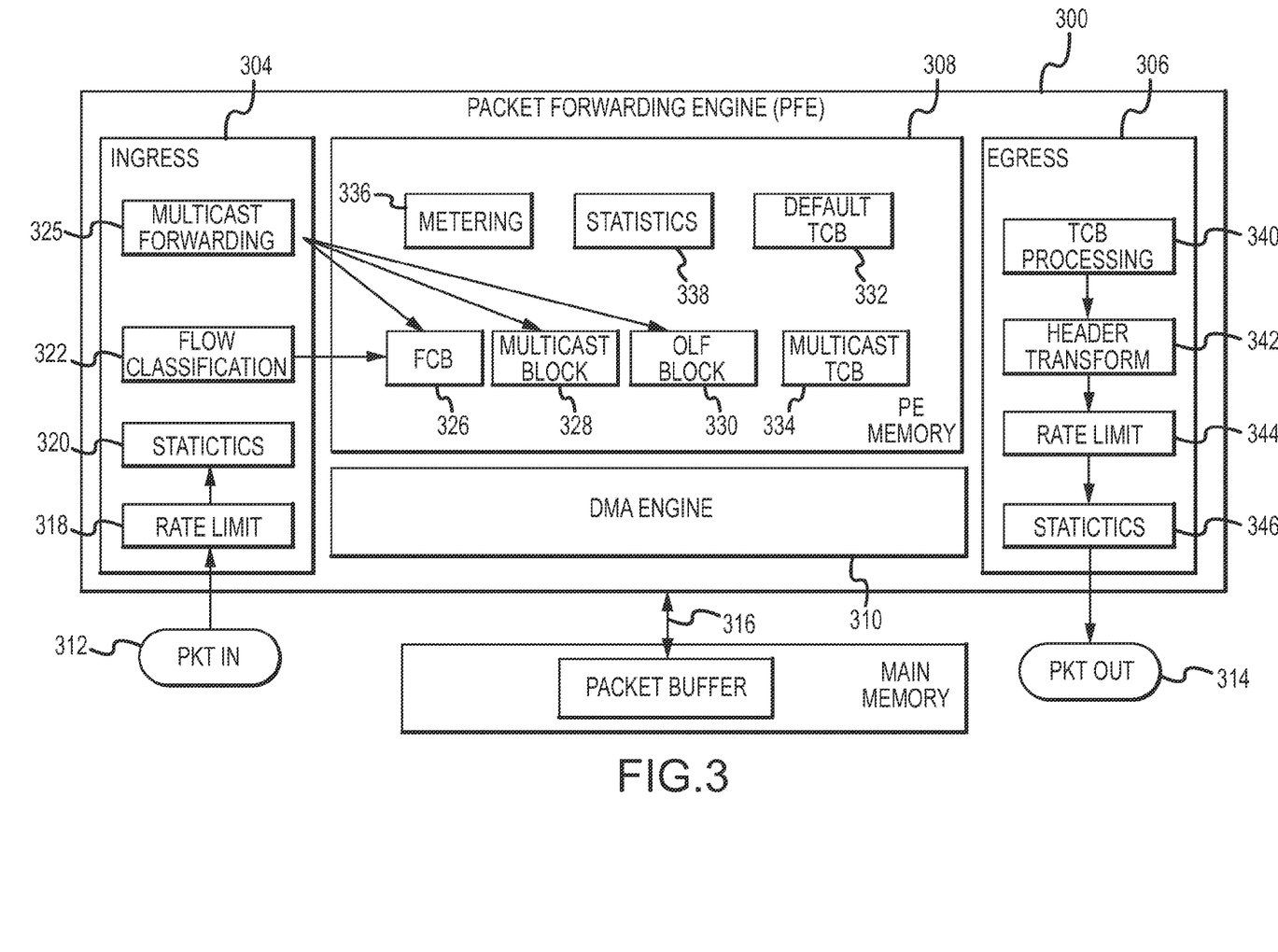
FIG. 3 is a block diagram of one example of a Packet Forwarding Engine (PFE) and a main memory of a VR in accordance with embodiments of the present invention.

FIG. 3 is a block diagram of one example of a Packet Forwarding Engine (PFE) 300 and a main memory 302 of a VR 128. In this example, PFE 300 includes an ingress module 304, an egress module 306, a PFE memory 308, a Direct Memory Access (DMA) engine 310, a packet input interface 312, a packet output interface 314, and a main memory interface 316. In this example, the ingress module 304 includes an ingress rate limit module 318, an ingress statistics module 320, a flow classification module 322, and a multicast forwarding module 324. In this example, the PFE memory 308 includes a Flow Control Block (FCB) 326, a multicast block 328, an Outbound InterFace (OIF) module 330, a default Transmit Control Block (TCB) 332, a multicast TCB module 334, a metering block 336, and a statistics block 338. In this example, the egress module 306 includes a TCB processing module 340, a header transform module 342, an egress rate limit module 344, and an egress statistics module 346.

Figure 4:
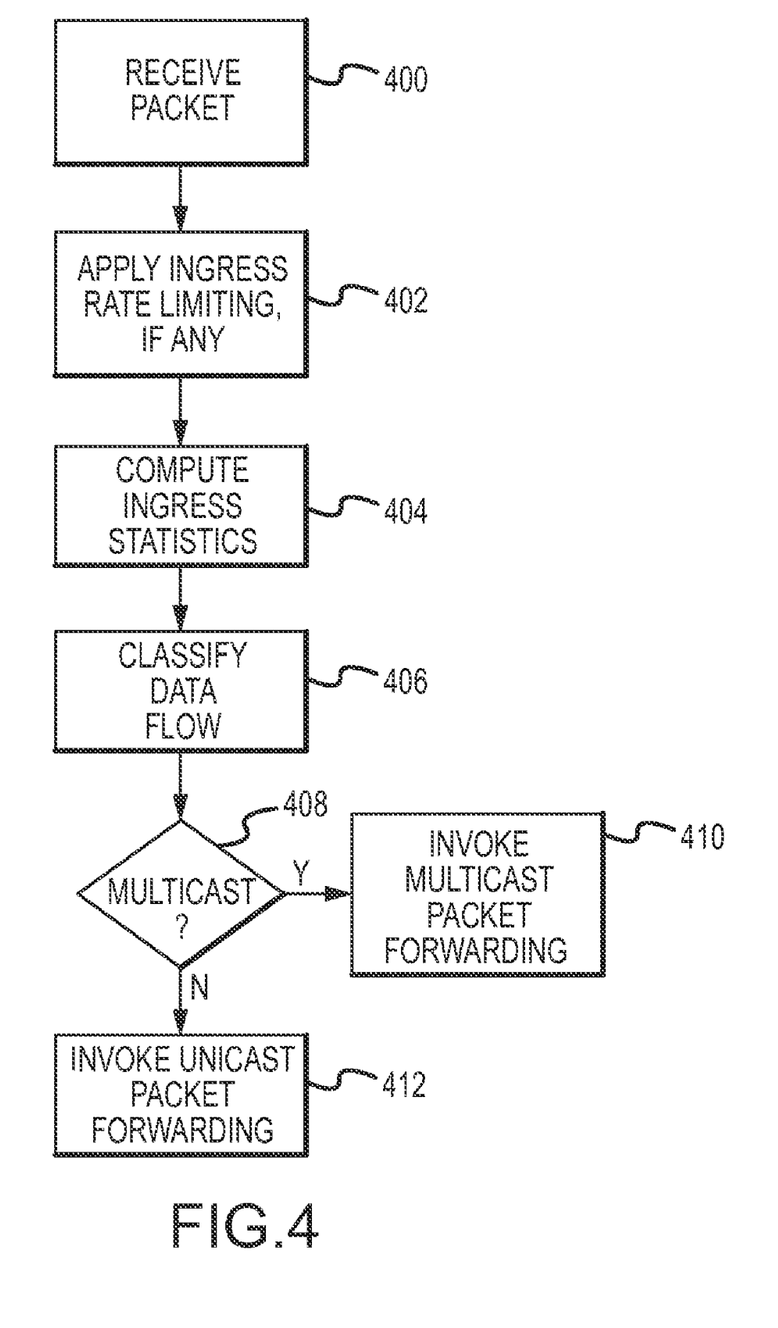
FIG. 4 is a flow chart illustrating a multicast internet protocol (IP) packet forwarding method in accordance with an embodiment of the present invention.

FIG. 4 is a flow chart of one example of a multicast internet protocol (IP) packet forwarding method such as can be performed, for example, by using the PFE 300 and main memory 302 of FIG. 3. At 400, a packet is received at the packet input interface 312 on a particular virtual interface (VI) of a particular VR in the router box 114. When a packet is received at 400, it is not known whether the packet is part of a multicast data flow or a unicast data flow. At 402, in one example, the ingress rate limit module 318 performs a rate limiting function to control a packet ingress data rate through the ingress module 304. At 404, in one example, the ingress statistics module 320 computes packet ingress statistics, such as packet count, byte count, etc. Such ingress statistics may be important for managing subscriber service levels, among other things.

At 406, in one example, the flow classification module 322 is used to classify the data flow, for example, as a unicast flow or a multicast flow. The flow classification module 322 typically uses a predefined portion of the packet header to classify the data flow, and to identify the particular FCB associated with the flow. For example, the "destination address" portion of the packet header is used to identify the packet as a multicast packet. In one example, in a first mode (sometimes referred to as a "strict-optimized mode"), the data flow classification uses the source IP address and the destination IP address portions of the packet header to classify the data flow. In a second mode (sometimes referred to as an "adaptive-optimized mode"), in which subscriber-specific services are needed, additional portions of the packet header are used to further classify the data flow in accordance with the appropriate services.

In one example, the flow classification at 406 uses the information extracted from the packet header to look up a corresponding FCB entry in FCB 326. If the data flow is a multicast data flow then, in one example, the corresponding FCB entry will have a "multicast" flag set, and a "forwarding action" field of the FCB entry will indicate that hardware forwarding of packets is to be used for the multicast data flow. At 408, if the classification indicates a multicast data flow, then, at 410, multicast packet forwarding is invoked. Otherwise, at 412, unicast packet forwarding is invoked.

Each FCB entry in FCB 326 includes information identifying a particular multicast session. Each multicast session is defined by a {Source, Group} pair, which is sometimes referred to as an {S, G} pair. The Source field of the {S, G} pair defines the source of the multicast transmission. In one example, this is a single multicast transmission source. In another example, there are multiple (e.g., redundant) transmission sources for the same multicast transmission. The Group field of the {S, G} pair defines a group corresponding to the multicast session. In one example, the group can be conceptualized as a "channel" of content. There may be one recipient or a very large number of recipients of the content. Such recipients of the multicast content can join or leave the Group at will, such as by issuing the appropriate Internet Group Management Protocol (IGMP) request or using one or more other protocols. Thus, scalability and the ability to easily update the Group are desirable qualities of the present multicast forwarding systems and methods.

Since each multicast session can have multiple IP flows associated with that particular multicast session, there can be multiple FCBs associated with the same {S, G}, where each FCB corresponds to one of these IP flows, and the {S, G} defines the particular multicast session. This may be true, for example, in the adaptive-optimized mode case, where because of the different services levels needed, there are different IP flows associated with the same multicast session.

Figure 5:
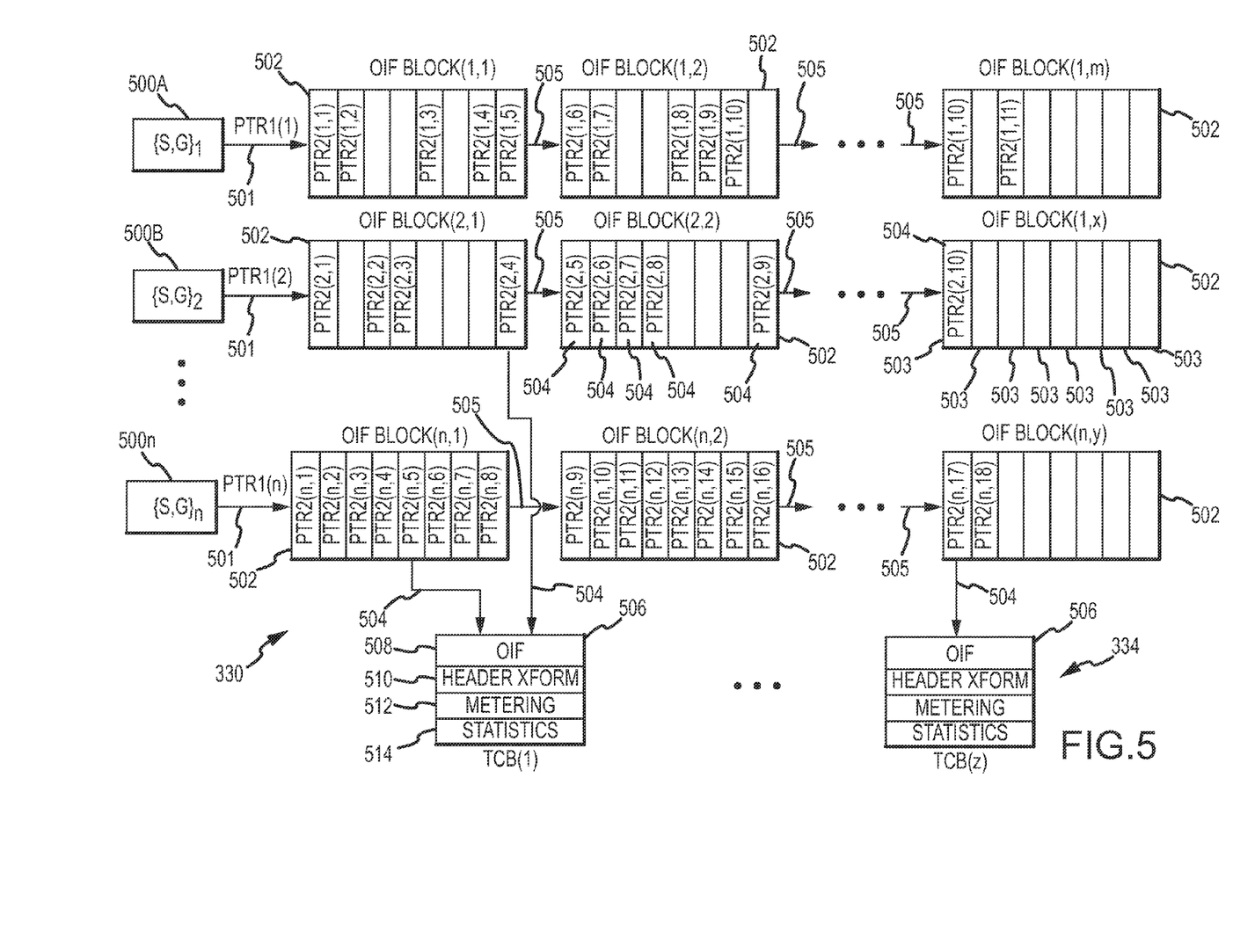
FIG. 5 is a block diagram of an OIF module and multicast TCB module for a set of multicast sessions in accordance with an embodiment of the present invention.

FIG. 5 is a block diagram of one example of an OIF module 330 and multicast TCB module 334 for a set of multicast sessions defined by respective {S, G} pairs $\{S, G\}_1$ through $\{S, G\}_n$. The {S, G} pair 500 of a particular multicast session includes a first pointer 501 that points to a dynamically allocated set of OIF Blocks 502. The particular number of OIF Blocks 502 depends on how many OIFs are then participating in that multicast session. For a particular multicast session, each OIF block 502 points to a subsequent OIF block 502 (with the exception of the last OIF block 502 in this conceptual "chain" of OIF blocks).

Each OIF block includes a reasonably small number of slots 503 for storing corresponding second pointers 504 to a TCB 506 for a particular OIF. The example of FIG. 5 illustrates eight slots 503 per OIF block 502, each slot for storing a corresponding second pointer 504 to a TCB 506. Another example includes six second pointer slots 503 per OIF block 502. Each second pointer 504 points to a particular TCB 506 for a particular OIF, which may service one or more users participating in the corresponding multicast session. Each OIF block 502 typically has the same number of second pointer slots 503 as every other OIF block 502, however, the number of OIF blocks 502 can vary between different {S, G} pairs, or even for the same {S, G} pair, such as at different points in time when different numbers of OIFs are part of that particular multicast session. More particularly, as OIFs are added or removed from a multicast session (such as may happen when users join or leave the multicast session) corresponding second pointers 504 are added or removed, respectively. If needed, additional OIF blocks 502 are added or removed, such as to accommodate the addition or removal of the second pointers 504. Using the present systems and methods, dynamically adding or removing such OIF blocks 502 as needed is easy because, among other things, each multicast session includes OIF blocks 502 that are chained together by third pointers 505 from one OIF block 502 to another OIF block 502 (except for the last OIF block 502 in the chain). When a user joins or leaves a multicast session under circumstances that require adding or removing an OIF to that multicast session, the OIF list can be updated by simply updating a single OIF block 502, during which time the other OIF blocks 502 in that chain are still available and usable for performing multicast forwarding. Although FIG. 5 illustrates a typical example in which each multicast session (defined by a particular {S, G} pair) points to its own chain of OIF blocks 502, it is possible that, in one example implementation, different multicast sessions point to the same (shared) chain of OIF blocks 502. This will likely be the less typical case, for example, in which these two or more different multicast sessions each have the same OIFs participating in that multicast session. This can be conceptualized as two or more different channels that are being "watched" by the same OIFs. When this occurs, the pointers from each such multicast session can point to the same (shared) chain of OIF blocks 502, if desired. Alternatively, separate chains of OIF blocks 502 can be maintained for each multicast session, for example, if such a simplified implementation is desired.

Each second pointer 504 points to a particular TCB 506, which typically includes information relevant to processing or routing packets to the particular OIF that is associated with that second pointer 504, or to services associated with the particular OIF that is associated with that second pointer 504. For example, if the packet header matches particular services in the ACL, attributes in the TCB are adjusted accordingly to obtain such services. Each second pointer 504 corresponds to a particular outbound interface (OIF) out which multicast packets are being forwarded, such as from the packet output interface 314 of the VR out over the network.

Because more than one multicast session can use the same OIF of the VR, second pointers 504 from different multicast sessions can point to the same (shared) TCB 506 for that OIF. In the illustrative example of FIG. 5, the second pointer PTR2 (2,4) from the second multicast session points to the shared TCB(1) as the second pointer PTR2($n$,5) from the nth multicast session. Thus, second pointers 504 from different multicast sessions may share the same TCB 506.

Similarly, because multiple IP flows can use the same OIF, there can be multiple TCBs 506 for the same OIF, such as for multiple IP flows on the same OIF, where such multiple flows use different services and, therefore, have different corresponding TCBs 506.

In FIG. 5, for example, a particular TCB 506 typically includes, among other things, OIF information 508, header transformation information 510, metering information 512, and statistics information 514. The OIF information 508 includes, for example, information identifying which OIF will be used by the packet output interface 314 to output the packets from the VR. The header transformation information 510 includes, for example, Media Access Control (MAC) address generation information and protocol independent multicast (PIM) encapsulation information for that particular OIF. The metering information 512 includes, for example, egress rate limiting or other like information for that particular OIF. The statistics information 514 includes egress statistics collection information for that particular OIF.

The schema depicted in FIG. 5 provides numerous advantages. As discussed above, scalability from one to very many users is a desirable property. The ability to update the multicast forwarding schema as many users join or leave different multicast sessions (which sometimes results in adding or removing OIFs) is another desirable property. For example, when a user joins or leaves a multicast session under circumstances that require adding or removing an OIF to that multicast session, the OIF list can be updated by simply updating a single OIF block 502, during which time the other OIF blocks 502 in that chain are still available and usable for performing multicast forwarding.

The schema depicted in FIG. 5 allows many users to be managed very efficiently because of, among other things, its use of first pointers 501 from {S, G} pairs to shared or independent chains of OIF blocks 502, and per-OIF second pointers 504 to shared or independent TCBs 506. Moreover, each OIF block 502 is typically apportioned into a small number of second pointer slots 503. Each OIF block 502 is typically independently addressable and updatable when updating that OIF block to add or remove a particular OIF's second pointer 504. As an illustrative example, if the OIF corresponding to second pointer PTR2(1,3) in OIF Block (1,1) was removed from the multicast session of {S, G}$_1$ (for example, because all of the one or more users of that OIF left that multicast session), then the second pointer PTR2(1, 3) in that OIF Block (1, 1) is removed, opening one second pointer slot 503 in OIF Block (1, 1) that could later be filled by another second pointer for another OIF being added (e.g., to service one or more users joining that multicast session).

While such updating of a particular OIF block 502 is occurring, other OIF blocks 502 in the same or a different chain of OIF blocks 502 are still usable to carry out multicast forwarding to the users represented by the second pointers 504 in those other OIF blocks 502. This improves the ability to multicast content, without interruption, to a large number of recipient users on different OIFs of a particular multicast session, even as other second pointers 504 are added or removed, such as to accommodate other recipient users of that multicast session that are joining or leaving that multicast session. In one example, both OIF blocks 502 and TCBs 506 are capable of being dynamically allocated as needed. Together with the sharing of TCBs 506 or even of OIF chains, as discussed above, the schema illustrated in FIG. typically offers one or more of the advantages of scalability, updatability, efficiency in memory usage, and high throughput performance with reduced interruptions.

Figure 6:
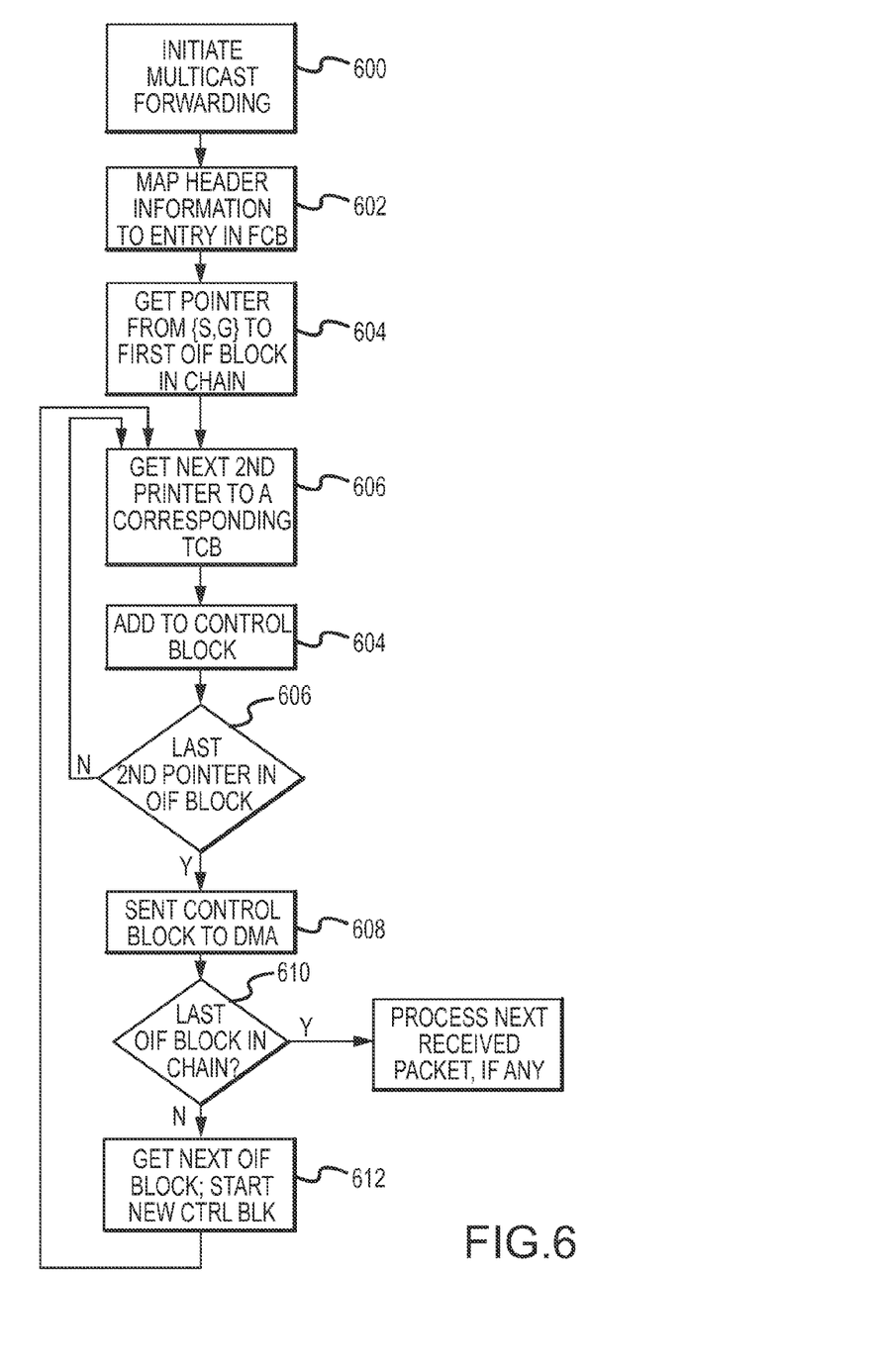
FIG. 6 is a flow chart illustrating a process that is invoked in accordance with an embodiment of the present invention if multicast packet forwarding is invoked in FIG. 4.

FIG. 6 is a flow chart of one example of a process that is invoked if multicast packet forwarding is invoked at 410 of FIG. 4. At 600, a multicast forwarding operation is initiated, such as by calling executable or interpretable instructions of the multicast forwarding module 324. At 602, information in the packet header is mapped to an FCB entry in FCB module 326. Each FCB entry in the FCB module 326 identifies an IP flow or a group of IP flows for an {S, G} pair 500 corresponding to a particular multicast session. At 604, from that FCB entry, a first pointer 501 is extracted to the first OIF block 502 in the chain of one or more OIF blocks 502 corresponding to that multicast session.

At 606 the next second pointer 504 in the current OIF block 502 is retrieved. At 606, the retrieved second pointer 504 to a TCB 506 is used to build a portion of a control block that will be sent to the DMA engine 310. At 606, if other second pointers 504 exist in the current OIF block 502, then process flow returns to 606. Otherwise, process flow proceeds to 606 and the control block that was constructed for the completed OIF block 502 is sent to the DMA engine 310. In this manner, one control block corresponding to each OIF block 502 is sent to the DMA engine 310 after that control block is constructed from the corresponding OIF block 502. At 610, if other OIF blocks 502 exist in that chain, then the next OIF block 502 is retrieved and made the current OIF block, a new control block is initiated, and process flow returns to 606. Otherwise, at 610, if no other OIF blocks 501 exist in the chain, then process flow proceeds to 614 to process (or wait for) the next received packet (e.g., at 400 of FIG. 4).

Figure 7:
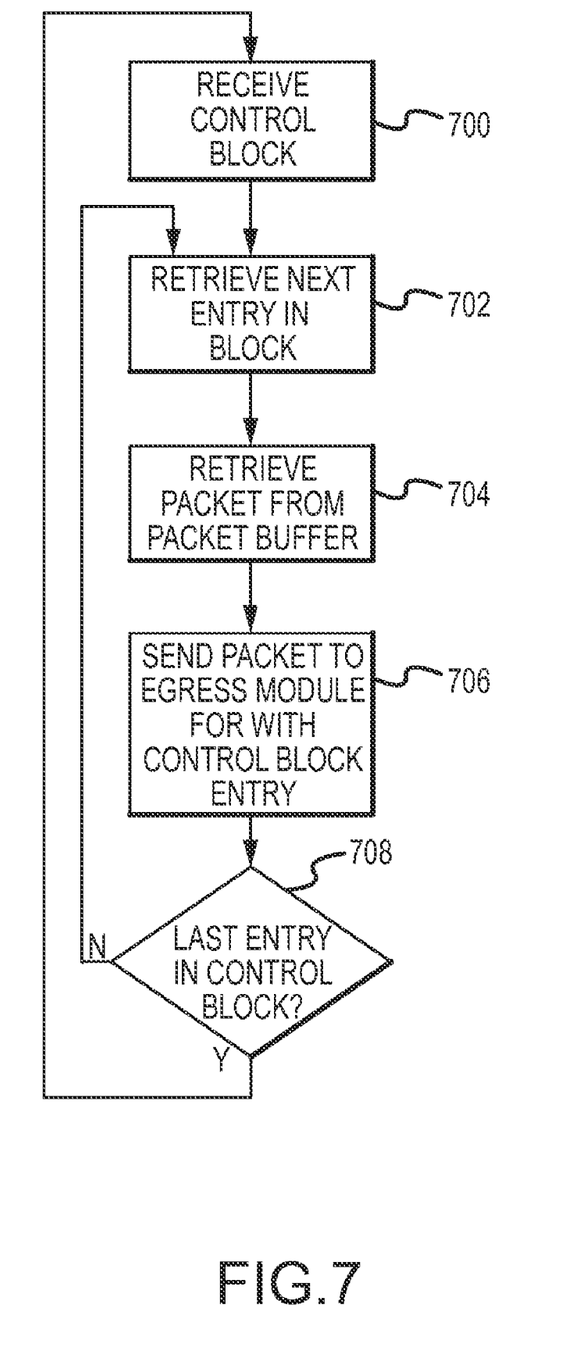
FIG. 7 is a flow chart illustrating packet retrieval and replication in accordance with an embodiment of the present invention.

FIG. 7 is a flow chart of one example of packet retrieval and replication. At 700, the DMA engine 310 receives a control block (such as from 608 in FIG. 6). At 702, the next entry in the received control block is retrieved. At 704, the stored packet is retrieved from a packet buffer in the main memory 302 by DMA engine 310. At 706, the retrieved packet is sent to the egress module 306 for egress transmission, along with the corresponding control block entry, which provides information to the egress module 306 about how that particular packet is to be processed for the particular recipient user corresponding to the control block entry, which, in turn, corresponded to a particular second pointer 504, as discussed above. At 708, if there are more entries in the control block, then process flow returns to 702 to retrieve the next entry in the control block. Otherwise, process flow returns to 700 to receive (or wait for) another control block. In the manner illustrated in FIG. 7, a packet is held in the packet buffer in the main memory 302 so that it can be replicated. The replicated packets are sent to the egress module 306 for further processing (particular to the user that is to receive that replicated packet) and transmission that OIF.

Figure 8:
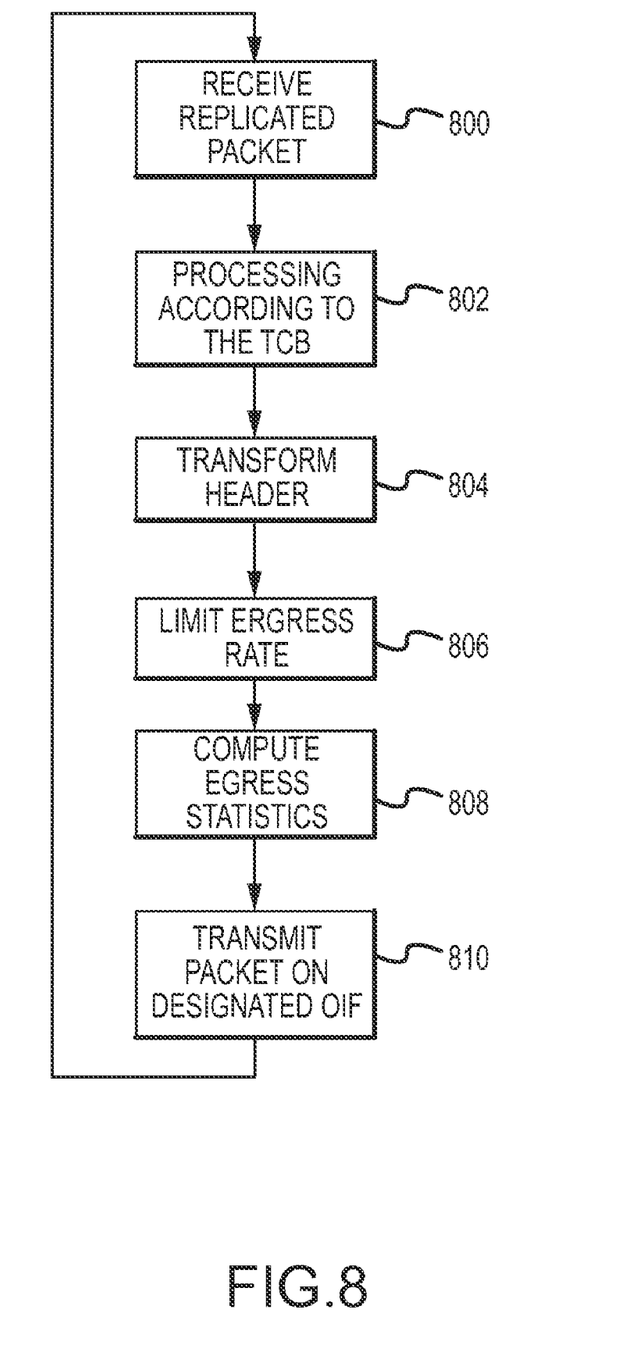
FIG. 8 is a flow chart illustrating processing by an egress module in accordance with an embodiment of the present invention.

FIG. 8 is a flow chart of one example of processing by the egress module 306. At 800, a replicated packet is received from the DMA engine 310. At 802, the replicated packet is processed according to the TCB 506 corresponding to the particular OIF's second pointer 504. As discussed above, such information is encapsulated into the control block that was submitted to the DMA engine 310, and communicated to the egress module 306 along with the replicated packet. At 804, header transformation occurs. In one example, this includes MAC address generation or encapsulation appropriate for the designated OIF over which the replicated packet will be transmitted. At 806, egress rate limiting, if any, is applied. At 808, egress statistics, if any, are computed. At 810, the replicated packet is transmitted out over the computer network on the designated OIF.

Figure 9:
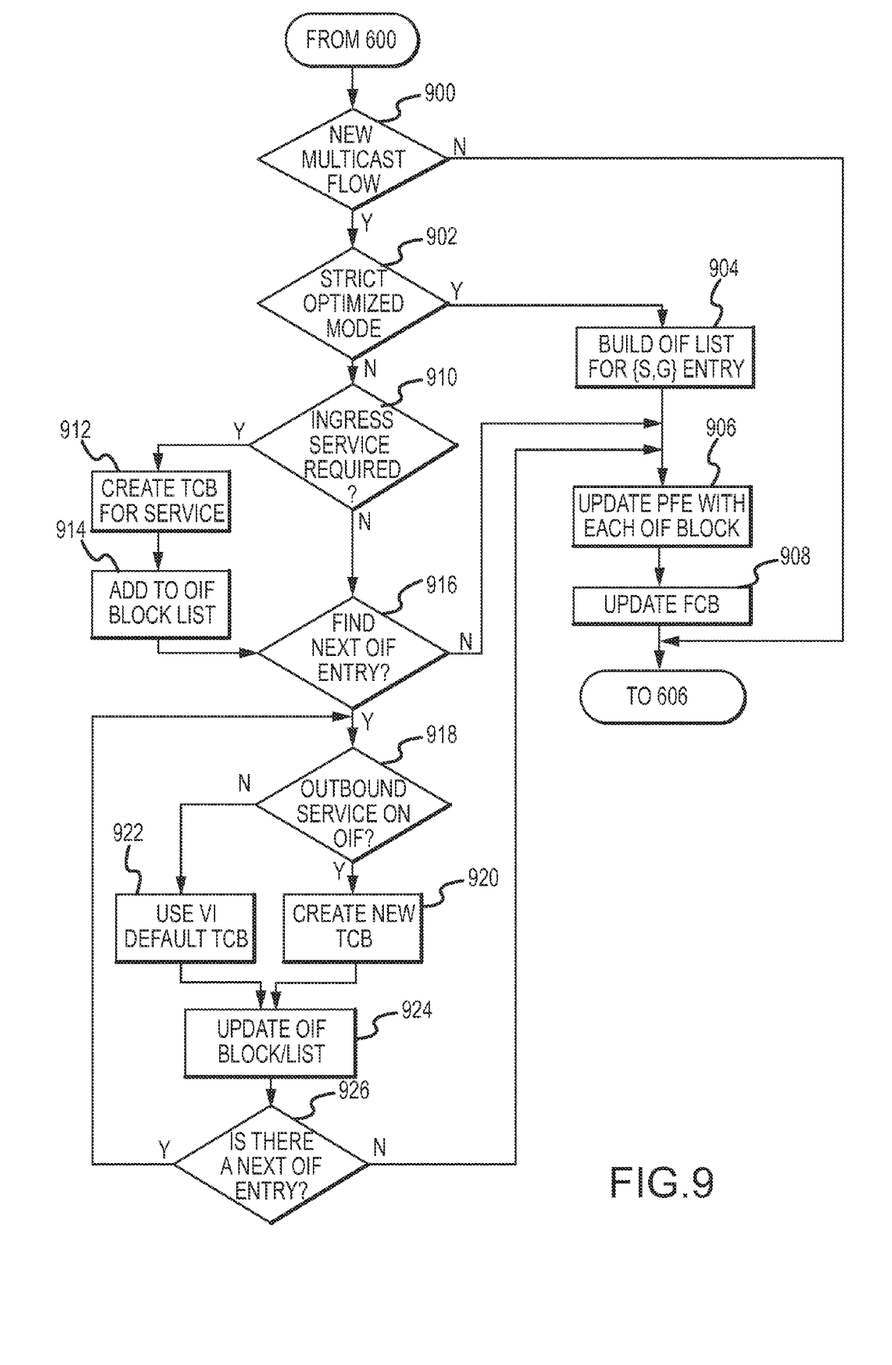
FIG. 9 is a flow chart illustrating more detail of acts included in the multicast forwarding in accordance with an embodiment of the present invention.

FIG. 9 is a flow chart of one example of more detail of acts included in the multicast forwarding, such as at 602 of FIG. 6 or elsewhere, as appropriate. Among other things, the flow chart of FIG. 9 illustrates one example of how TCBs 506 are created and, where possible, shared.

At 900, the system determines whether a received packet represents a new IP flow. This can be determined by looking at the above-described attributes in the packet header that identify a particular IP flow. If the packet corresponds to a previously identified multicast IP flow, then process flow proceeds to 606, and a previously defined FCB entry and a previously defined TCB 506 are used for further multicast forwarding processing. If a new flow is detected at 900, there will be no matching FCB entry in FCB 326. Therefore, for a new flow detected at 900, a new FCB entry will be created in FCB 326, as discussed below.

If a new flow is detected at 900, then, at 902, is its determined whether the new flow is a strict optimized mode or, instead, is in an adaptive optimized mode that provides one or more services for that particular flow. This determination is typically made using a configurable attribute.

At 902, if in the strict optimized mode, then, at 904, an OIF list (e.g., a chain of OIF blocks, as illustrated in FIG. 5) is built for the {S, G} entry corresponding to the newly identified multicast flow. Because no flow-specific services are required, this OIF list includes second pointers 504 to a default TCB corresponding to each OIF in that multicast session. This default TCB does not include any per-flow of ACL-based service-specific attributes. Instead this default TCB typically depends only on attributes and services that are applicable to all flows associated with the particular VI serving as the OIF. Each OIF participating in the multicast session will have a corresponding second pointer 504 to its corresponding default TCB. Then, at 906, the OIF module 330 of the PFE 300 is updated with each OIF block 502 in the chain of OIF blocks that make up the OIF list of that particular multicast flow. The OIF module 330 of the PFE 300 is typically updated with such OIF blocks 502 on a block-by-block basis. Then, at 908, the FCB 326 of the PFE 300 is updated to include, for example, a pointer to the OIF list for the newly identified multicast flow. Then, process flow proceeds to 606 of FIG. 6 (or elsewhere, if appropriate).

At 902, if in the adaptive optimized mode instead of the strict optimized mode, then, at 910 it is determined whether any ingress services are needed. In one example, this includes checking for such ingress services on the VI 208 at which the packet is received. At 910, if one or more such ingress services are needed, then, at 912, a TCB 506 is created to control the providing of any such ingress services, (otherwise process flow proceeds to 916). Then, at 914, a second pointer 504 is created to point to this newly created TCB 506. This newly created TCB 506 for the ingress services includes an OIF field 508 that specifies a null OIF (the PFE 300 does not actually forward any packets out any such null OIF).

At 916, it is determined whether there is a next OIF entry (that is, a second pointer 504) in the OIF list for the new multicast flow. If there is no such next OIF entry (e.g., upon specification of an invalid {S, G} entry or a null OIF), then process flow proceeds to 906. Otherwise, at 918, it is determined whether any outbound services are needed on the next OIF entry in the OIF module 330. If so, then, at 920, a new TCB 506 is created for that OIF entry to control the providing of any such outbound services, otherwise, at 922, the VI default TCB 332 is used for that OIF entry. Then, at 924, a second pointer 504 is created to point to the new TCB 506 or the default TCB 332, as appropriate, and the OIF list for that multicast session is updated accordingly. Then, at 926, it is determined if there is a next OIF entry in the OIF list for the multicast session. If so, process flow returns to 918, otherwise process flow proceeds to 906.

Using the above process described with respect to FIG. 9, some TCBs 506 may be shared by multiple second pointers 504. For example, the default TCB 332 is likely shared by multiple second pointers 504. Other TCBs 506 may correspond to individual second pointers 504.

Although the above examples have been discussed with respect to a router box providing virtual routers (e.g., VRs 128), the present systems and methods are not so limited. For example, certain aspects of the present systems and methods are also applicable to alternative systems using hardware routers instead of the virtual routers.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A network switch module comprising:
a memory partitioned among a plurality of virtual routers (VRs);
a plurality of processors partitioned among the plurality of VRs; and
wherein each VR of the plurality of VRs maintains a data structure in the memory, the data structure including information relating to a set of multicast sessions being handled by the VR and including:
a first pointer for each multicast session in the set of multicast sessions;
at least one chain of one or more blocks of second pointers, in which each first pointer points to one chain of one or more blocks of second pointers, and in which each second pointer corresponds to an outbound interface (OIF) of the VR participating in the multicast session defined by the first pointer and defines how many times packets associated with the multicast session are to be replicated; and
one or more transmit control blocks (TCBs) representing data structures configured to store control information relevant to processing or routing packets, in which each second pointer points to a TCB of the one or more TCBs, in which each TCB of the one or more TCBs identifies the OIF out which packets of the multicast session are transmitted from the VR.

2. The network switch module of claim 1, wherein each block of second pointers is independently updatable to permit the other blocks of second pointers to be concurrently used for accessing corresponding TCBs.

3. The network switch module of claim 1, wherein at least one block of second pointers includes a third pointer to a subsequent block of second pointers in the chain of one or more blocks of second pointers.

4. The network switch module of claim 1, wherein each TCB includes control information for processing replicated packets.

5. The network switch module of claim 4, wherein the control information includes one or more of header transformation control information, metering control information and statistics control information.

6. The network switch module of claim 1, wherein a common TCB is permitted to be assigned to more than one second pointer.

7. The network switch module of claim 6, wherein each second pointer, in the more than one second pointer to which the common TCB is assigned, corresponds to a different multicast session.

8. The network switch module of claim 1, wherein multiple first pointers are permitted to point to the same chain of one or more blocks of second pointers.

9. The network switch module of claim 1, wherein multiple first pointers are permitted to point to a common chain of one or more blocks of second pointers when the multicast sessions corresponding to the multiple first pointers share a common OIF.

10. A network switch module comprising:
a memory partitioned among a plurality of virtual routers (VRs);
a plurality of processors partitioned among the plurality of VRs; and
wherein each VR of the plurality of VRs maintains a data structure in the memory, the data structure including information relating to a set of multicast sessions being handled by the VR and including:
a plurality of pairs of a source field and a group field ({S, G} pairs) stored in the memory, in which each pair of the plurality of {S, G} pairs defines a multicast session of the set of multicast sessions and wherein the source field defines a source of a multicast transmission and the group field defines a group corresponding to the multicast session;
a first pointer associated with each of the plurality of {S, G} pairs that points to a dynamically allocated set of OIF blocks, wherein a number of outbound interface (OIF) blocks in the set of OIF blocks is dependent upon how many of a plurality of OIFs of the VR are currently participating in the multicast session and the number of OIF blocks in the set of OIF blocks defines how many times packets associated with the multicast session are to be replicated;
a set of slots associated with each OIF block of the set of OIF blocks, each slot of the set of slots configured to store a second pointer to a transmit control block (TCB) which services one or more users participating in the multicast session and which represents a data structure configured to store control information relevant to processing or routing packets, including information regarding an OIF of the plurality of OIFs out which the packets are to be transmitted;
a third pointer associated with each OIF block of the set of OIF blocks to chain together the set of OIF blocks and thereby allow dynamic addition or removal of OIF blocks to or from the set of OIF blocks responsive to users joining or leaving the multicast session.

11. The network switch module of claim 10, wherein each OIF block of the set of OIF blocks is independently accessible without affecting processing of other OIF blocks of the set of OIF blocks.

12. The network switch module of claim 10, wherein the TCB includes control information for processing replicated packets.

13. The network switch module of claim 12, wherein the control information includes one or more of header transformation control information, metering control information and statistics control information.

14. The network switch module of claim 10, wherein the second pointer associated with a first OIF block of the set of OIF blocks of a first {S, G} pair of the plurality of {S, G} pairs is permitted to point to and thus share a first TCB with another OIF block of the set of OIF blocks of the first {S, G} pair or with a second OIF block of the set of OIF blocks of a second (S, G} pair of the plurality of {S, G} pairs.

* * * * *